US006972819B2

(12) United States Patent
Lee et al.

(10) Patent No.: US 6,972,819 B2
(45) Date of Patent: Dec. 6, 2005

(54) METHOD OF MANUFACTURING IPS-LCD USING 4-MASK PROCESS

(75) Inventors: Deak-Su Lee, Taoyuan Hsien (TW); Sakae Tanaka, Taoyuan Hsien (TW)

(73) Assignee: Hannstar Display Corporation, Taipei (TW)

( * ) Notice: Subject to any disclaimer, the term of this patent is extended or adjusted under 35 U.S.C. 154(b) by 0 days.

(21) Appl. No.: 10/417,174

(22) Filed: Apr. 17, 2003

(65) Prior Publication Data

US 2004/0207791 A1   Oct. 21, 2004

(51) Int. Cl.[7] .................. G02F 1/136; G02F 1/1345

(52) U.S. Cl. ................. 349/149; 349/43; 430/5; 438/648; 257/350; 257/59

(58) Field of Search .............. 349/43, 149; 430/5; 438/648, 30; 257/350, 59, 72; 345/92

(56) References Cited

U.S. PATENT DOCUMENTS

| 5,674,647 | A | * | 10/1997 | Isao et al. ............... 430/5 |
| 5,882,827 | A | * | 3/1999 | Nakao .................... 430/5 |
| 6,335,129 | B1 | * | 1/2002 | Asano et al. ............. 430/5 |
| 6,403,980 | B1 | * | 6/2002 | Park ..................... 257/59 |
| 6,509,614 | B1 | * | 1/2003 | Shih .................... 257/350 |
| 6,531,392 | B2 | * | 3/2003 | Song et al. ............. 438/648 |

* cited by examiner

*Primary Examiner*—Huyen Ngo
(74) *Attorney, Agent, or Firm*—Oblon, Spivak, McClelland, Maier & Neustadt, P.C.

(57) ABSTRACT

A method of manufacturing an IPS-LCD using a 4-mask process including forming amorphous silicon islands and contact holes using the same mask. Each amorphous silicon island is used to form the channel of one transistor inside the active area, and each contact hole is used to form a portion of an anti-ESD circuit around the active area. Amorphous silicon islands and the contact holes are also found using a phase-shaft mask. The phase shift mask at least includes a high transmittance area, a low transmittance area, and a transparent area.

21 Claims, 13 Drawing Sheets

METHOD OF MANUFACTURING IPS-LCD USING 4-MASK PROCESS

BACKGROUND OF THE INVENTION

1. Field of the Invention

The present invention is concerned with a method of manufacturing an IPS-LCD (in plane switch-liquid crystal display) using a 4-mask process and a corresponding structure. Moreover, it is specifically related to a method of achieving a contact hole forming process and a channel island patterning process using only one mask before the formation of a second metal layer.

2. Description of the Background

In the fabrication of a conventional TFT-LCD (thin film transistor liquid crystal display), different photo masks are typically defined for the gate bus lines, the channel island (referred to as an amorphous silicon island), the data bus line, the passivation layer, the contact holes, and the pixel electrodes circuit. The more photo masks that are used, the greater the manufacturing cost. Thus, the reduction of the number of required photo masks is an important subject for the TFT-LCD industry.

Because the back channel etching type TFT-LCD structure requires no additional photolithography process nor deposition step, it is widely used to reduce the number of required photo masks. In fabrication, four different patterns with different materials and at least one contact hole are required. Hence, there are a minimum number of five photo masks required.

To further reduce the number of required photo masks, either two different layers must be patterned using the same photo mask or one material must be used for forming two different layers. In the prior art, some four-count mask processes have been introduced. For example, Samsung has provided a method of using a slit (or gray-tone) photolithography process in an IPS mode LCD to define the channel island and data bus line using the same slit mask. Thus, a four-count mask process is achieved. However, in the IPS mode LCD, an anti-ESD (electro static discharge) circuit is required to protect all transistors inside the active areas. Because the anti-ESD circuit is a transistor with a gate electrically coupled to a drain (or a source), a contact hole is formed to electrically connect the gate and the drain (or source). Thus, an extra photolithography process is required for patterning the contact hole.

Figure 1A:
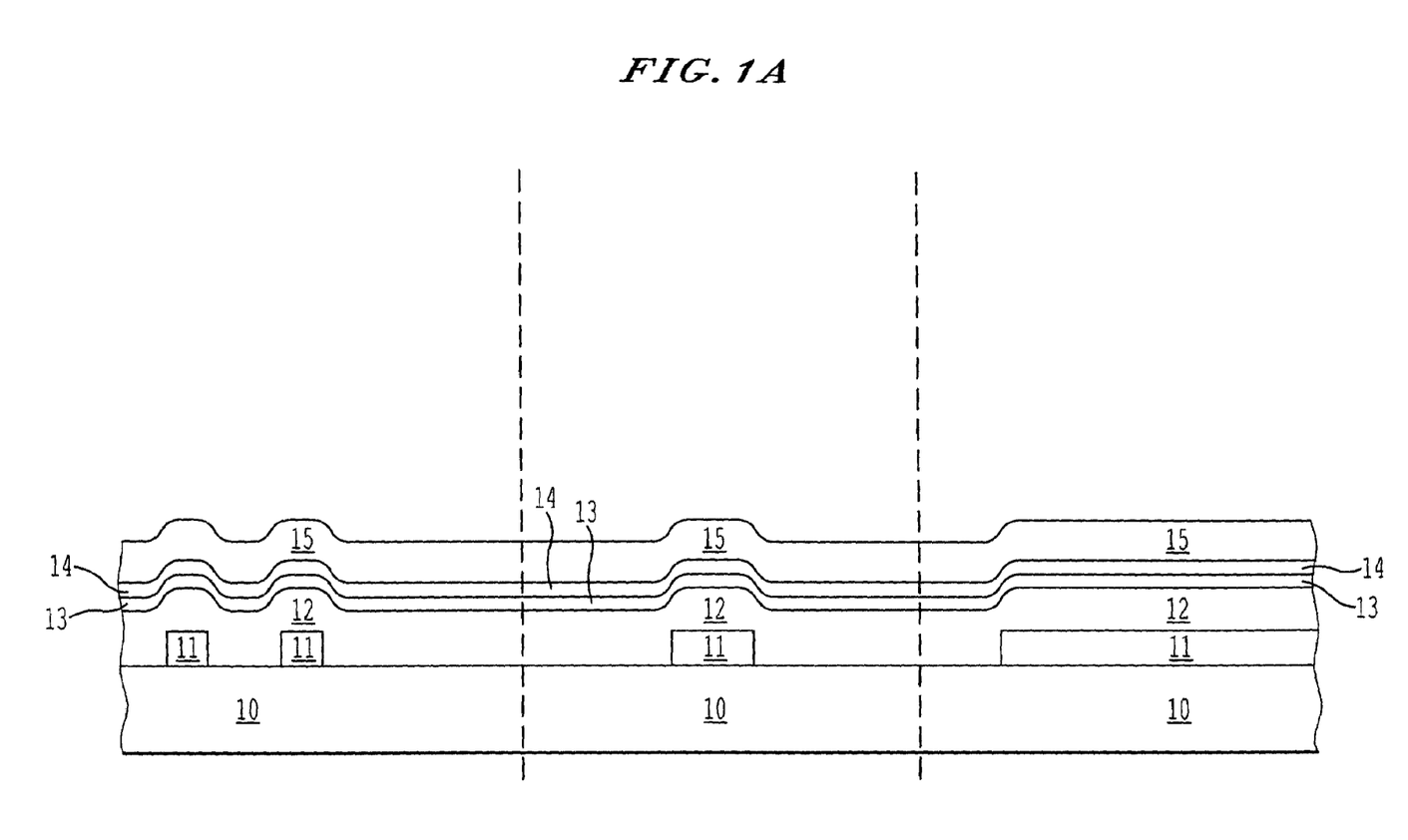
FIG. 1A to FIG. 1F are cross-sectional views showing the method of Samsung.

The method of Samsung could be described briefly as the following essential steps:

As shown in FIG. 1A, a first metal layer is formed on a substrate 10 and then the first metal layer is patterned to form first metal lines (or gate lines) 11 on the substrate 10 using a first mask. Finally, an insulator layer 12, a silicon based layer 13, a n+ silicon based layer 14 and a second metal layer 15 are formed on the substrate 10 and the first metal lines 11.

The substrate 10 is a transparent substrate and is divided into at least three separate areas: a common/pixel area, a transistor area and an anti-ESD circuit area. Moreover, because the method of Samsung focuses on the forming process of an IPS mode LCD, the layout of these areas is not limited and any conventional layout could be used.

Figure 1B:
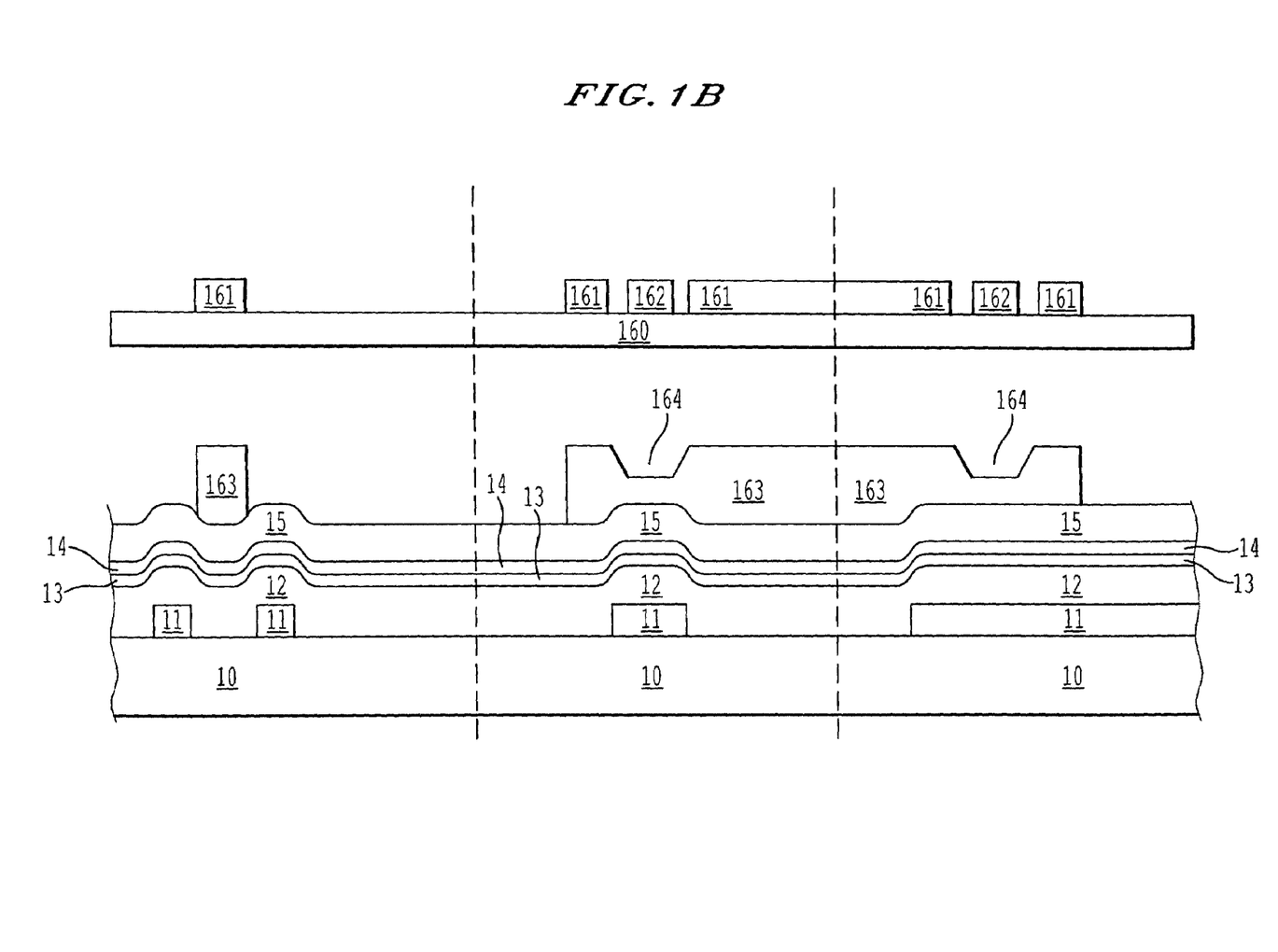

Further, as shown in FIG. 1B, a photoresist layer 163 is formed on the second metal layer 15 using a slit mask (a second mask). The slit mask includes the patterns 161 and 162, which are formed on a transparent substrate 160. The patterns 161 are located above conductive lines, such as bus lines, and the patterns 162 are located above transistors.

Thus, while the shapes of the patterns 161 and 162 are properly adjusted, especially while the distance(s) between the patterns 161 and neighboring patterns 162 is properly adjusted, some holes 164 are formed in the photoresist layer 163 and under the patterns 162.

Figure 1C:
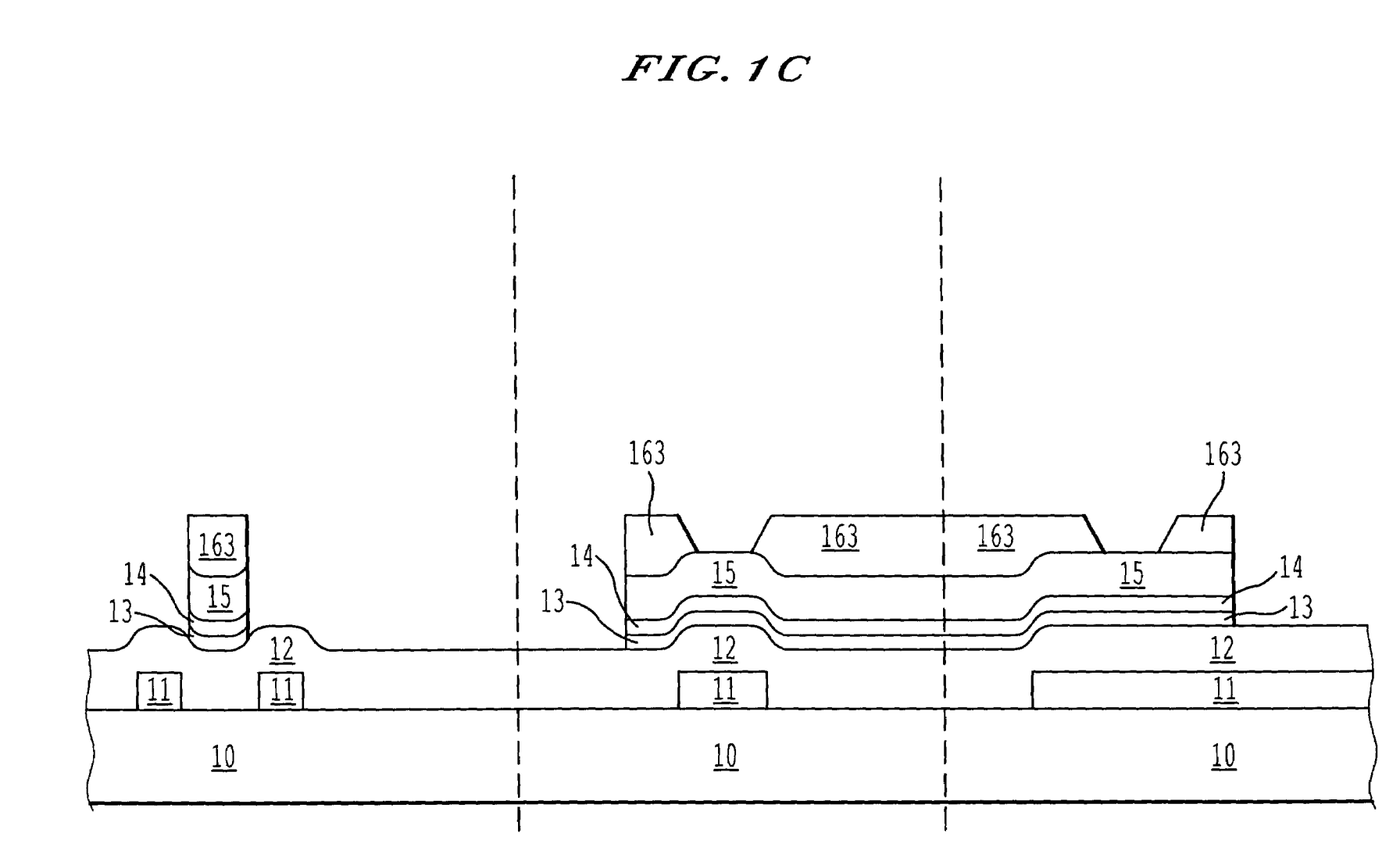

As shown in FIG. 1C, the second metal layer 15, the n+ silicon based layer 14 and the amorphous silicon layer 13 are patterned using the photoresist layer 163 as a mask.

Figure 1D:
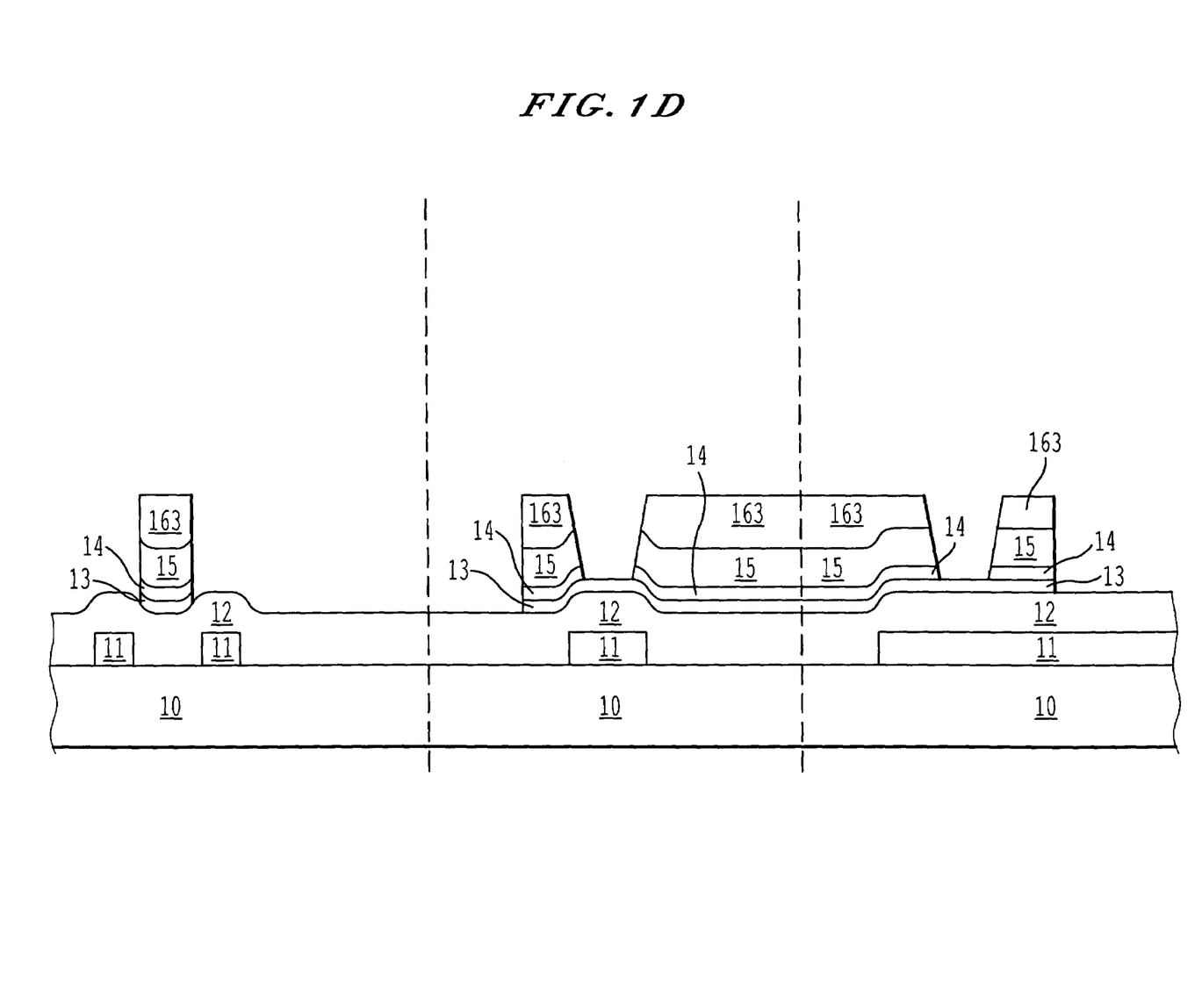

In addition, as shown in FIG. 1D, the photoresist layer 163 is etched to expose the second metal layer 15. The thickness of photoresist layer 163 is thus thick enough to endure the etching process, and is then used as a mask to define the channel of each transistor.

Figure 1E:
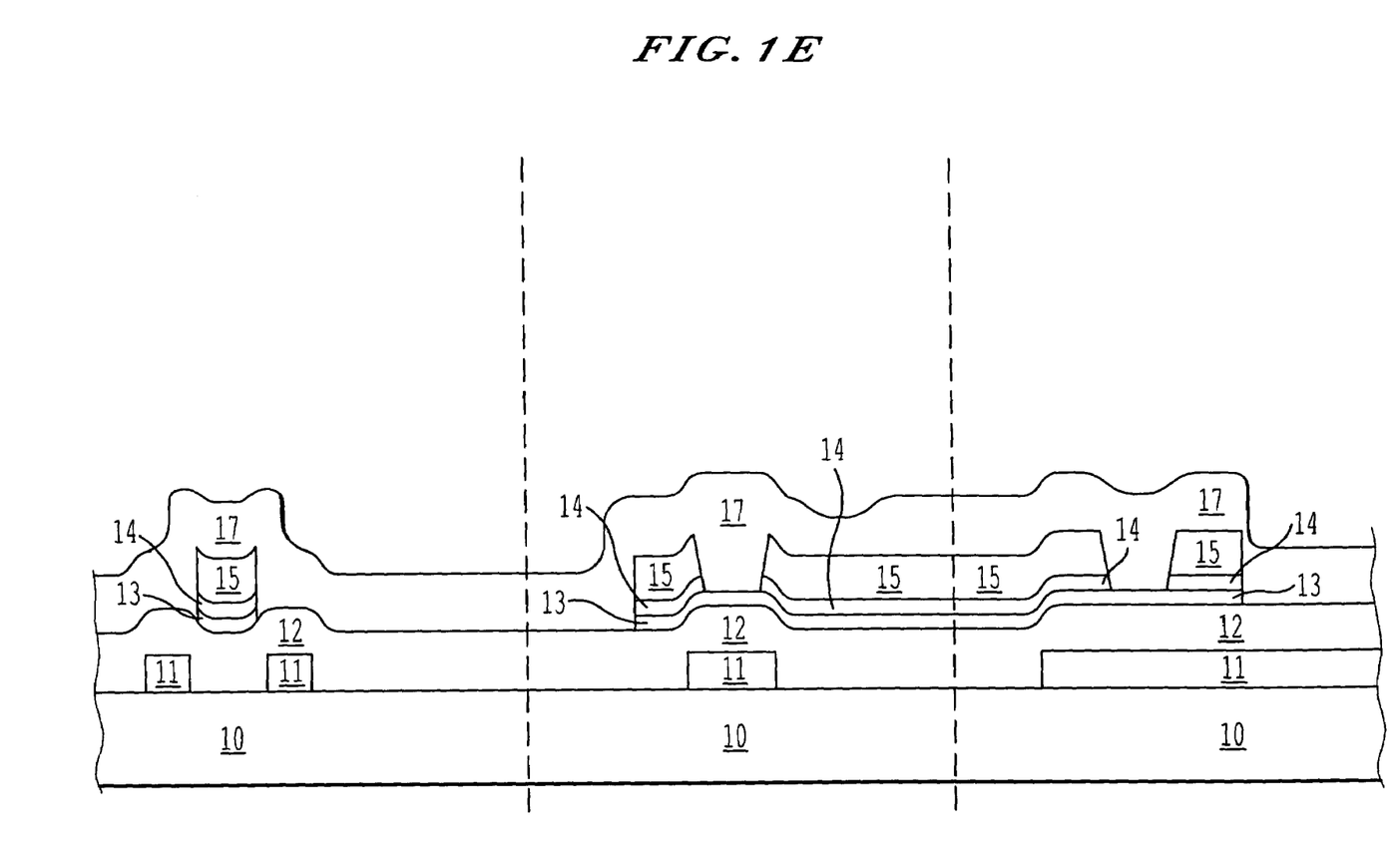

As shown in FIG. 1E, the residual photoresist layer 163 is removed and a passivation layer 17 is then formed over the substrate 10.

Figure 1F:
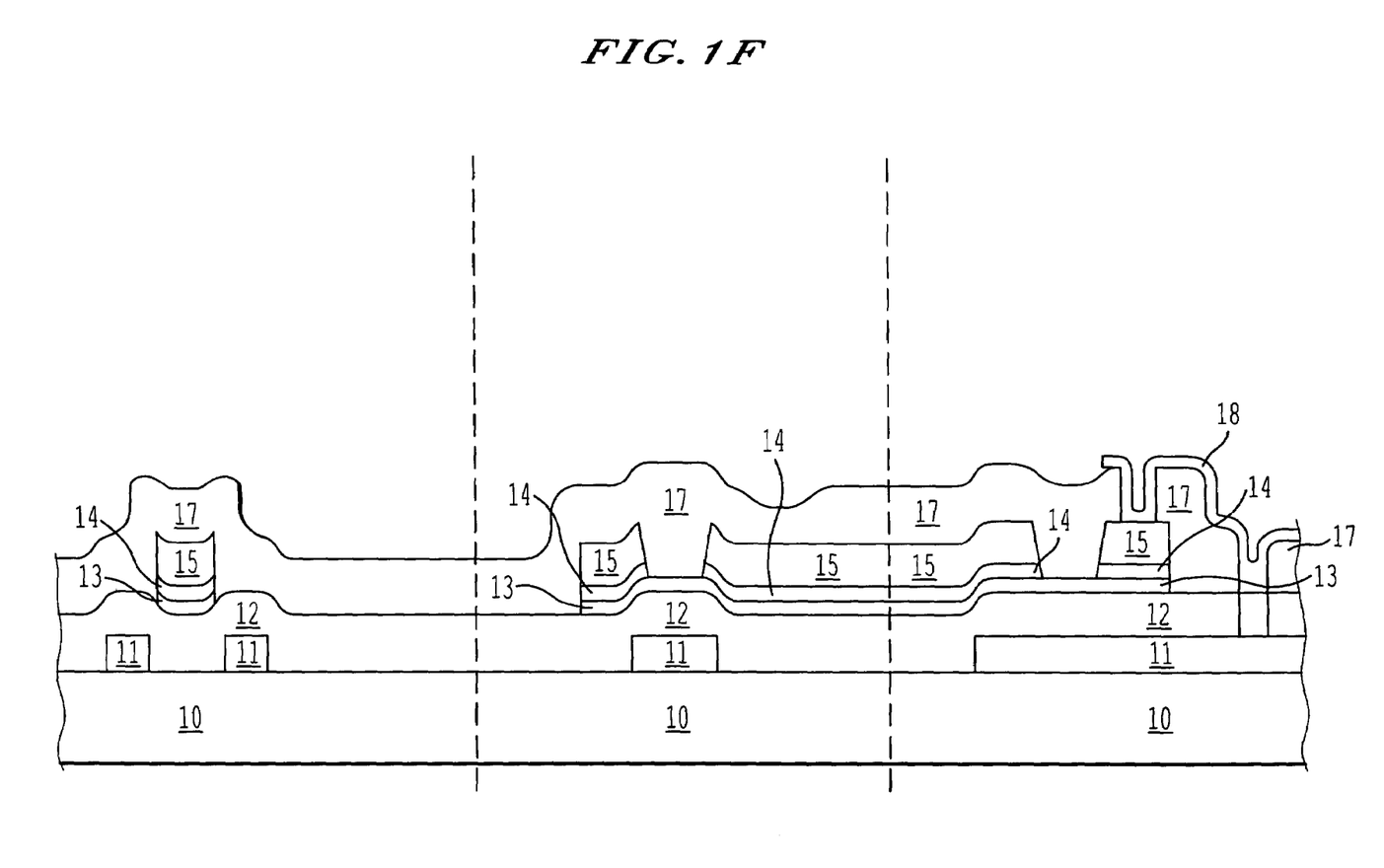

Further, as shown in FIG. 1F, an ITO layer 18 is formed on the anti-ESD circuit area to electrically connect the first metal lines 11 and the second metal layer 15. Two masks are required in FIG. 1F: one (a third mask) is for forming a contact hole to partially expose a first metal line 11 in the anti-ESD circuit area, and another (a fourth mask) is for patterning the ITO layer 18. The fourth mask also could be used to pattern some OLB (outer lead bonding) pads over the substrate 10.

The method of Samsung does not include a contact hole process before the source/drain forming process. Thus, a process for patterning the contact hole and an additional metal process for forming the electric connection between the first metal line 11 and the second metal line 15 are required where the electric connection is usually formed by an ITO transparent layer.

Clearly, the method of Samsung does not perfectly solve this problem. Any four-count mask process in IPS mode TFT-LCD without the usage of the ITO transparent layer would further reduce the manufacturing cost. Accordingly, the previous problem of reducing the required photo masks is an unsolved problem.

SUMMARY OF THE INVENTION

Accordingly, one object of the present invention is to improve the four-count mask process for manufacturing an IPS-LCD.

Another object of the present invention is to provide a novel four-count mask process which patterns the contact hole, the pixel electrodes and the channel island using one mask. Hence, a four-count mask process without the manufacturing cost of the ITO transparent layer is available.

Yet another object of the present invention is to provide a four-count mask process using a phase shift mask. The phase shift mask is divided into at least three areas: a high transmittance area, a low transmittance area, and a transparent area.

Another object of the present is to provide a novel IPS mode TFT-LCD panel where the electric connection of anti-ESD circuit is entirely covered by the passivation layer. Moreover, the electric connection could be made of the second metal of the TFT, thereby requiring no additional conductive material.

To achieve these and other objects, the present invention provides a novel method of manufacturing an IPS-LCD in which the photoresist layer for patterning the channel islands and the pixel electrodes are not located on the surface of the substrate. Further, the contact holes are instead located on predetermined locations which are not covered by the photoresist layer. Hence, the photoresist layer can be used to pattern the contact hole, the channel islands and the pixel electrodes with one photolithography process. Different etching processes are also used to remove different materials on different portions of the substrate. In addition, the phase shift mask includes a high transmittance area, a low transmittance area and a transparent area. The low transmittance area includes two materials, the high transmittance area includes one material, and the transparent area includes a transparent substrate. Therefore, the transparent area is used for patterning the contact hole, and the other areas are used for patterning the channel islands and the pixel electrodes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Referring now to the drawings, wherein like reference numerals designate identical or corresponding parts throughout the several views, the present invention will be described.

The first example of the present invention is a method of manufacturing an IPS-LCD using a 4-mask process, and will be described in reference to FIGS. 2A–2F.

Figure 2A:
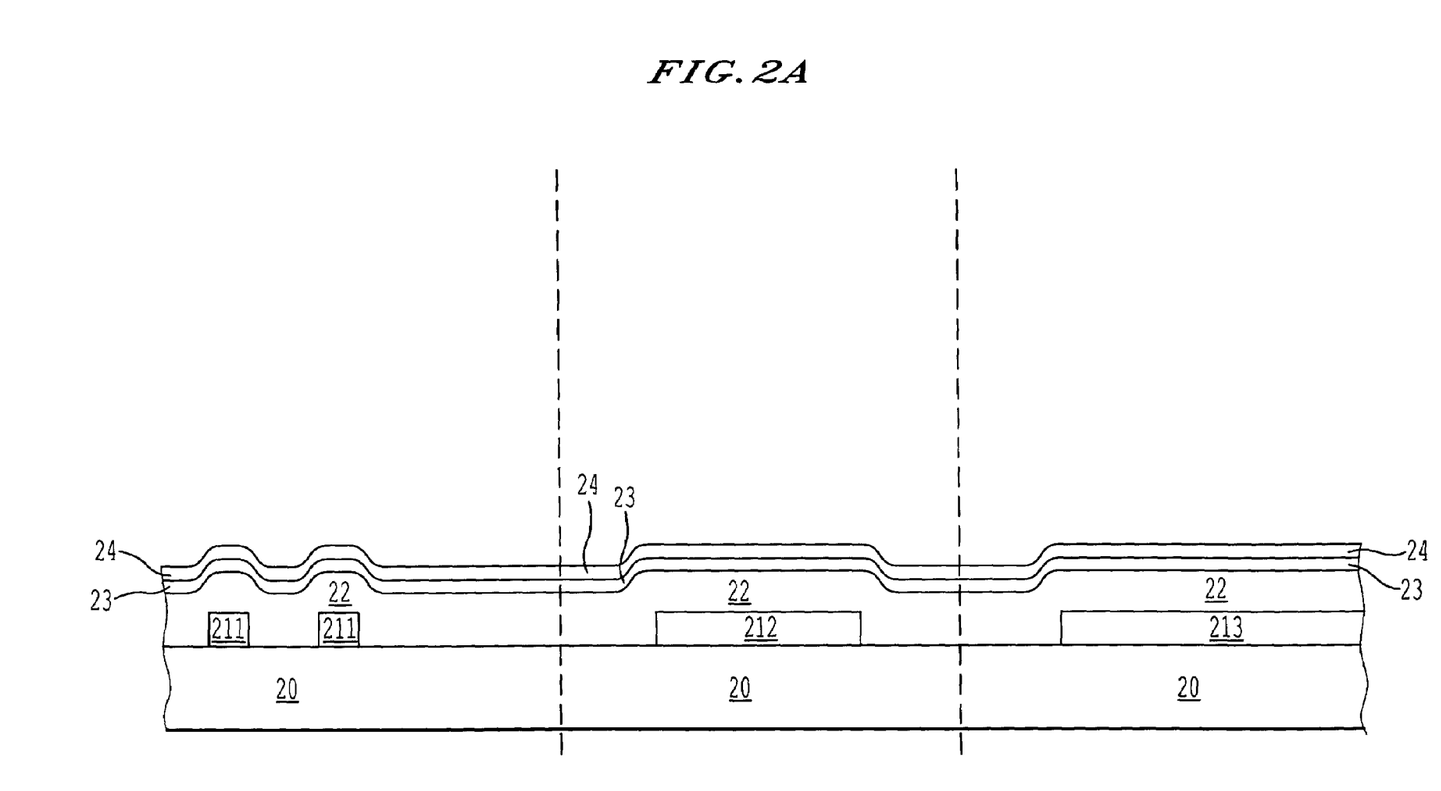
FIG. 2A to FIG. 2F are cross-sectional views showing the method of manufacturing an IPS-LCD according to a first example of the present invention.

As shown in FIG. 2A, a substrate 20 is provided that includes a common/pixel area, a transistor area and an anti-ESD circuit area. A first metal layer is formed on the substrate 20 and then is patterned by using a first mask. First metal lines 211 are formed on the common/pixel area, second metal lines 212 are formed on the transistor area, and third metal lines 213 are formed on the anti-ESD circuit area.

Sequentially, an insulator layer 22, a silicon based layer 23 and a semiconductive layer 24 are formed on the substrate 20 and the metal lines (211, 212 and 213) sequentially. The silicon based layer 23 generally includes an amorphous silicon (a-Si), and semiconductive layer 24 generally includes n+ amorphous silicon (n+ a-Si).

Figure 2B:
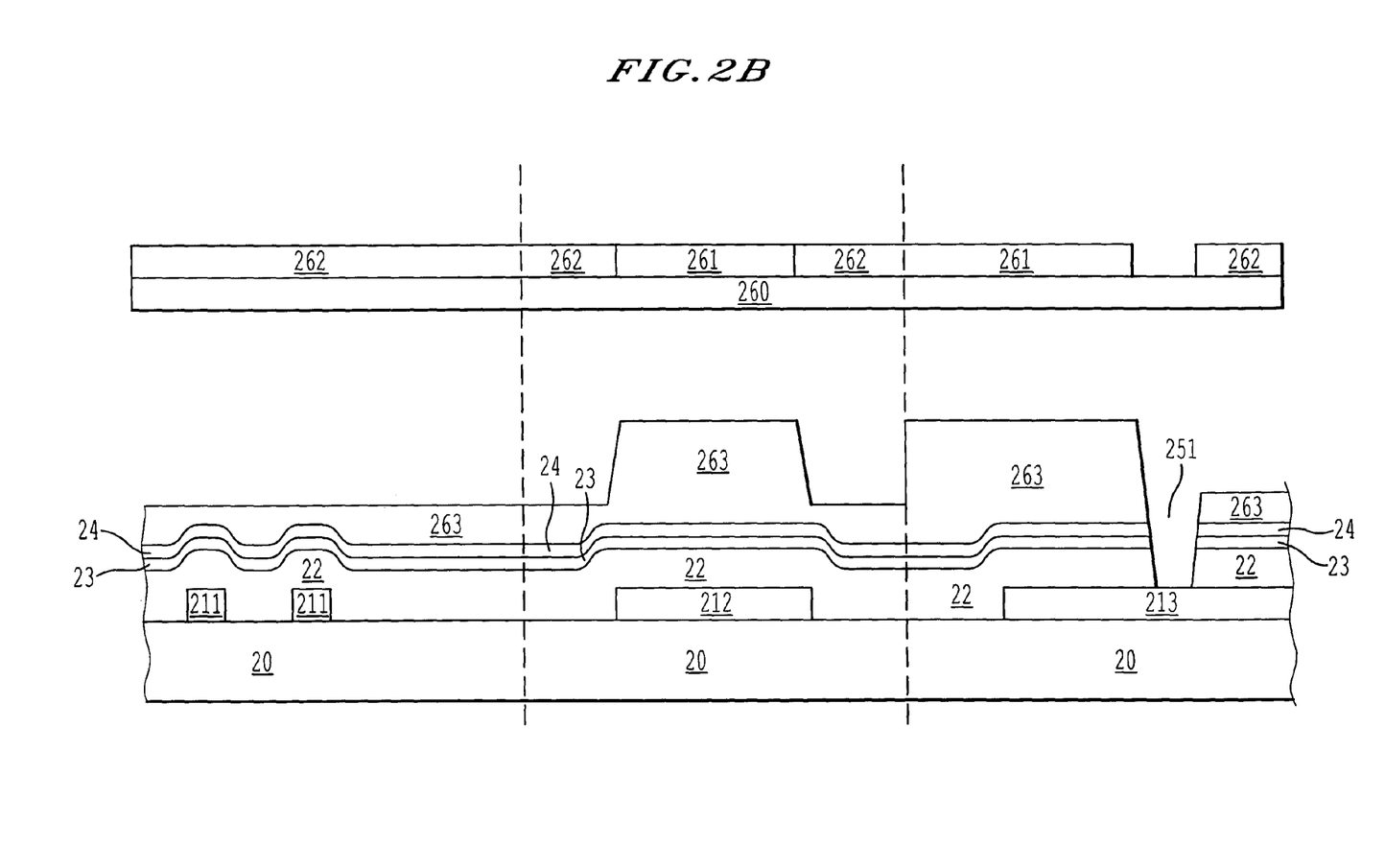

In addition, as shown in FIG. 2B, the photoresist layer 263 is formed on the semiconductive layer 24 by using a second mask (phase shift mask). The photoresist layer 263 has some openings over a portion of the third metal lines 213. Further, the portions of the photoresist layer 263 located over the second metal lines 212 are thicker than portions of the photoresist layer 263. The portions of the photoresist layer 262 located over the segment of each of the third metal lines 213 and the portions of the semiconductive layer 24 on the anti-ESD region are thicker than the portions of the photoresist layer 262 located over the other portions of the semiconductive layer 24.

The thickness of the thinner portion of photoresist layer 263 is approximately thirty percent of the thickness of the thicker portion of the photoresist layer 263. However, this example only limits that the partial photoresist layer 263 is thicker than the other portions of the photoresist layer 263. That is, the thickness ratio of the different portions of the photoresist layer 263 can vary.

The partial semiconductive layer 24, the partial silicon based layer 23 and the partial insulator layer 22 are next removed using the photoresist layer 263 as a mask, and the partial third metal lines 213 are exposed. Because the phase shift mask has a hole (a transparent area) over the anti-ESD circuit area, the first conduct hole 251 is formed in the insulator layer 22 on the anti-ESD circuit area.

Figure 2C:
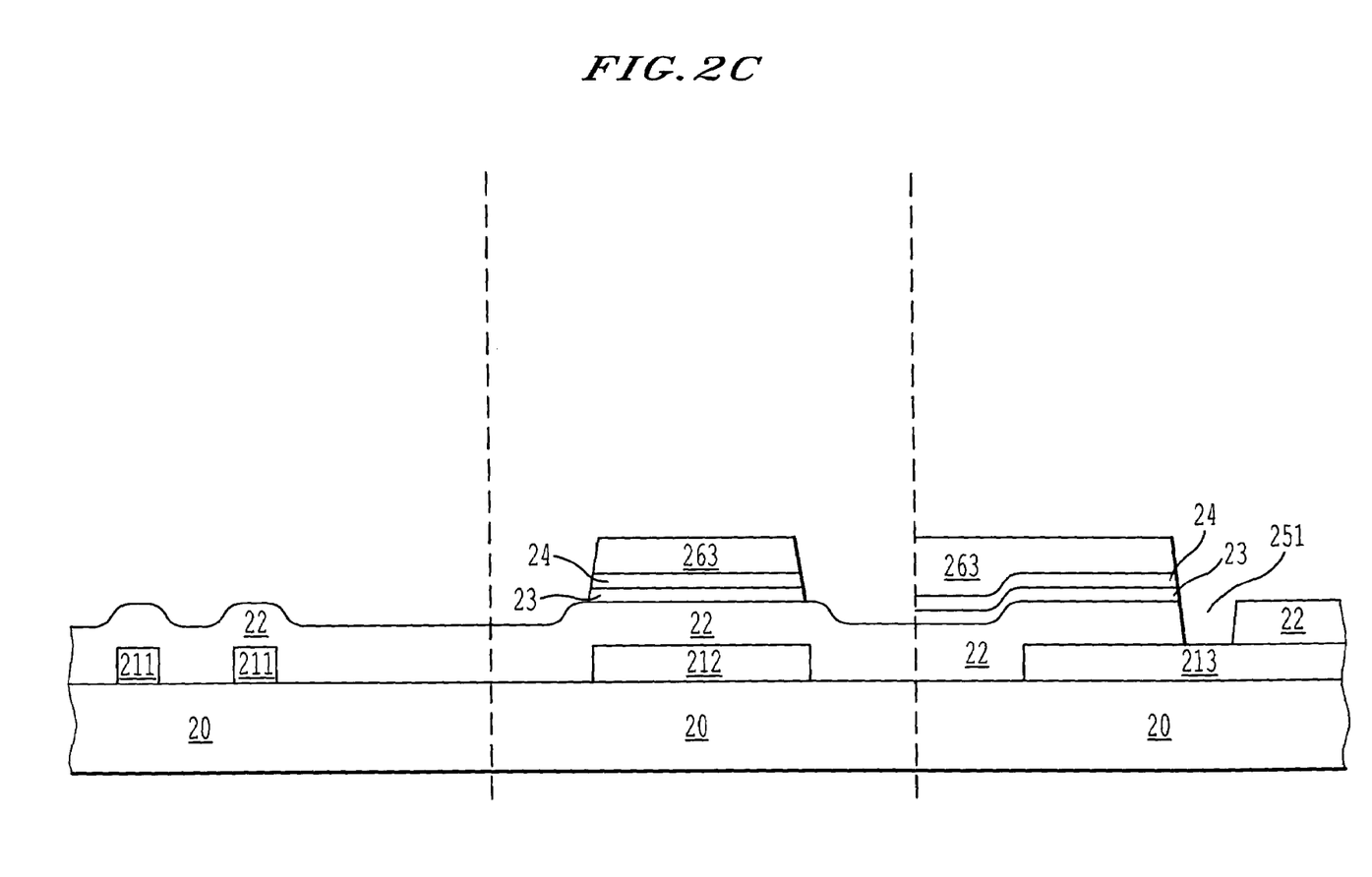

As shown in FIG. 2C, the photoresist layer 263 is ashed to remove the thinner portion of the photoresist layer 263. This results in the thickness of the thicker portion of the photoresist layer 263 also being reduced. The residual photoresist layer 263 is then used as a mask to remove the partial semiconductive layer 24 and the partial silicon based layer 23.

Figure 2D:
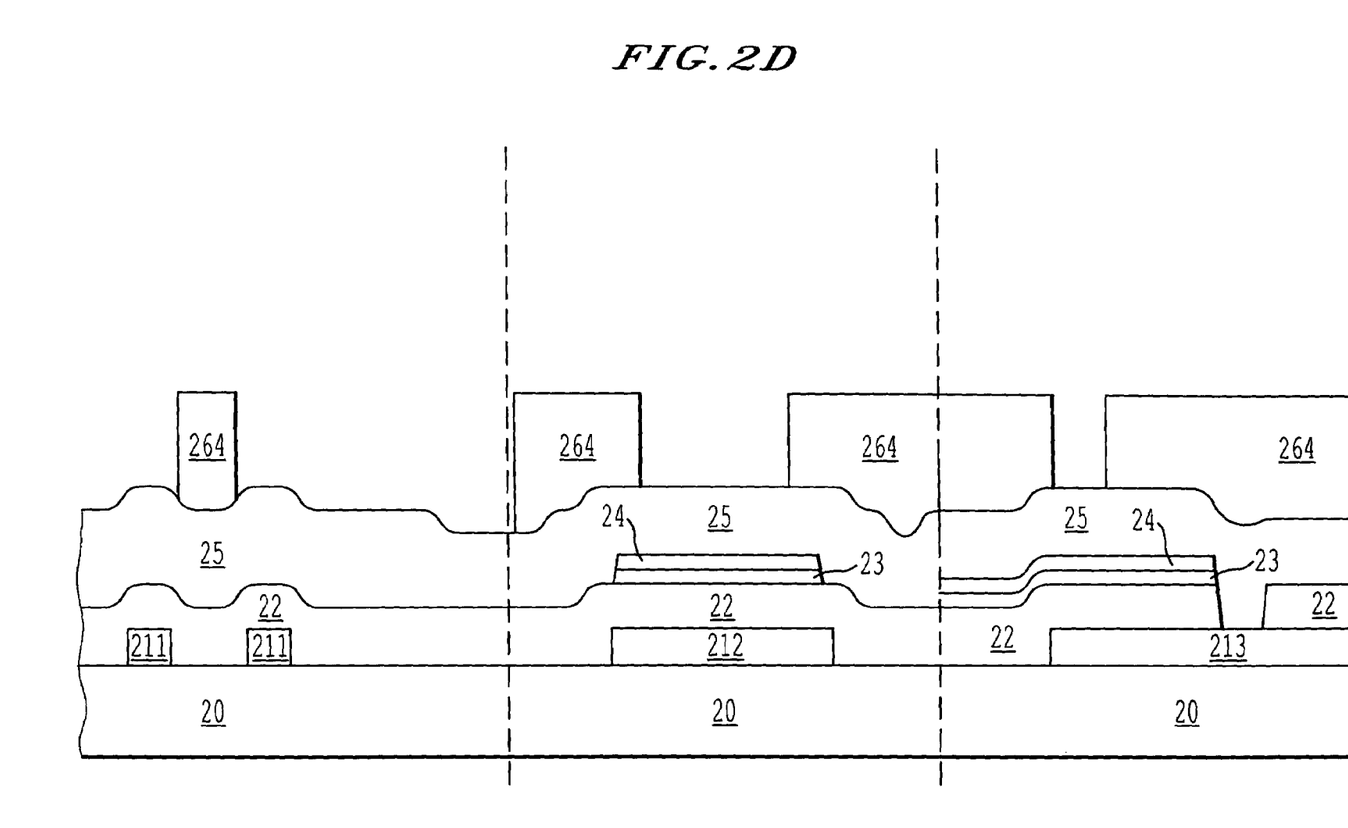

As shown in FIG. 2D, the residual photoresist layer 263 is removed and a second metal layer 25 is then formed on the insulator layer 22 and the residual semiconductive layer 24 thereby also filling the first contact hole 251, shown in FIG. 2C. The patterned photoresist layer 264 is then formed on the second metal layer 25, and is patterned by a third mask.

Figure 2E:
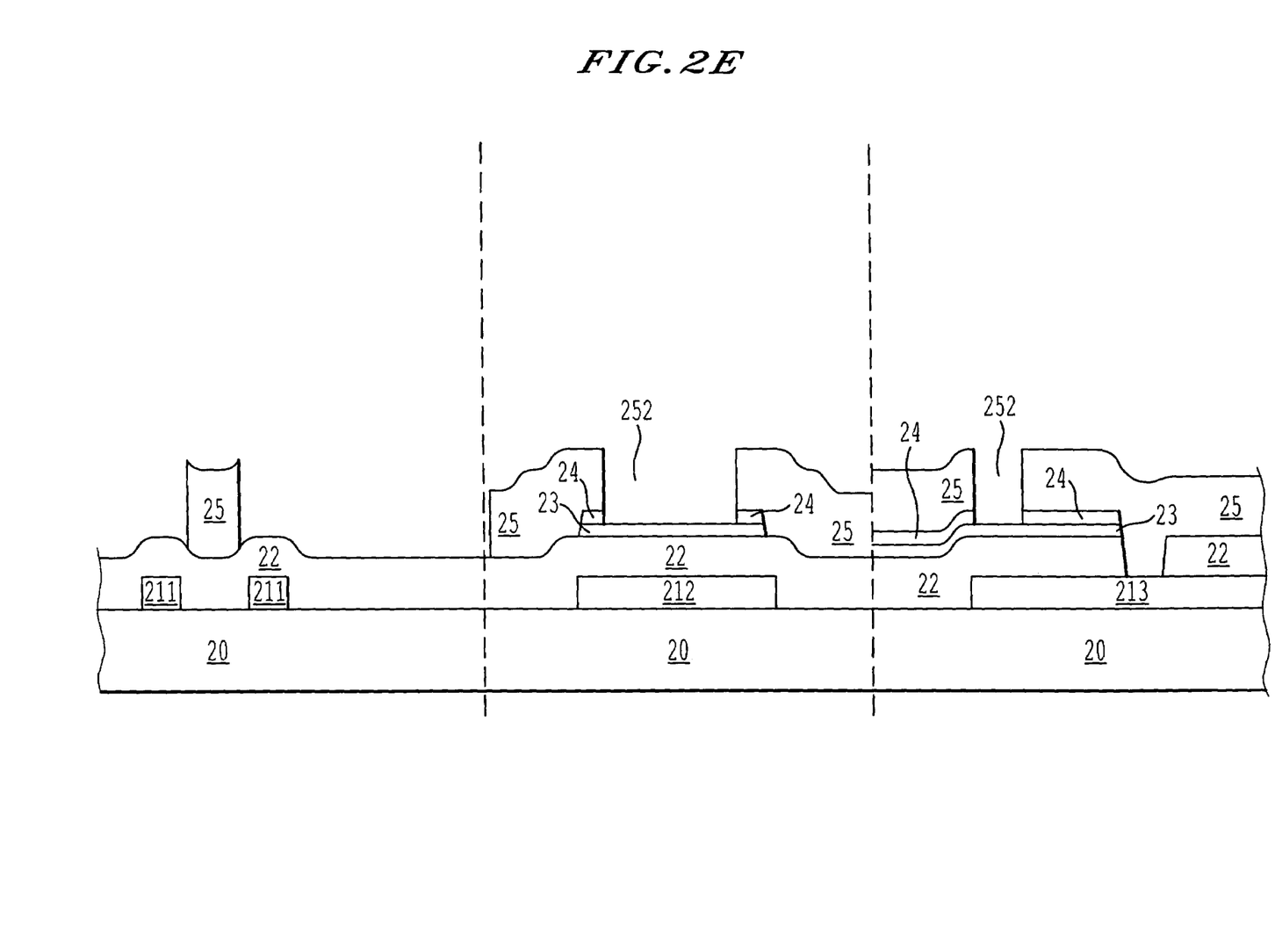

In addition, as shown in FIG. 2E, the second metal layer 25 is patterned by using the patterned photoresist layer 264 as a mask. Thus, the second contact holes 252 are formed in the second metal layer 25 and over the second metal lines 212 and the third metal lines 213. However, the second contact holes 252 are not overlapped with the first contact hole 251. Further, the partial semiconductive layer 24 that was exposed from the second contact holes 252 is removed and then the patterned photoresist layer 264 is removed.

Figure 2F:
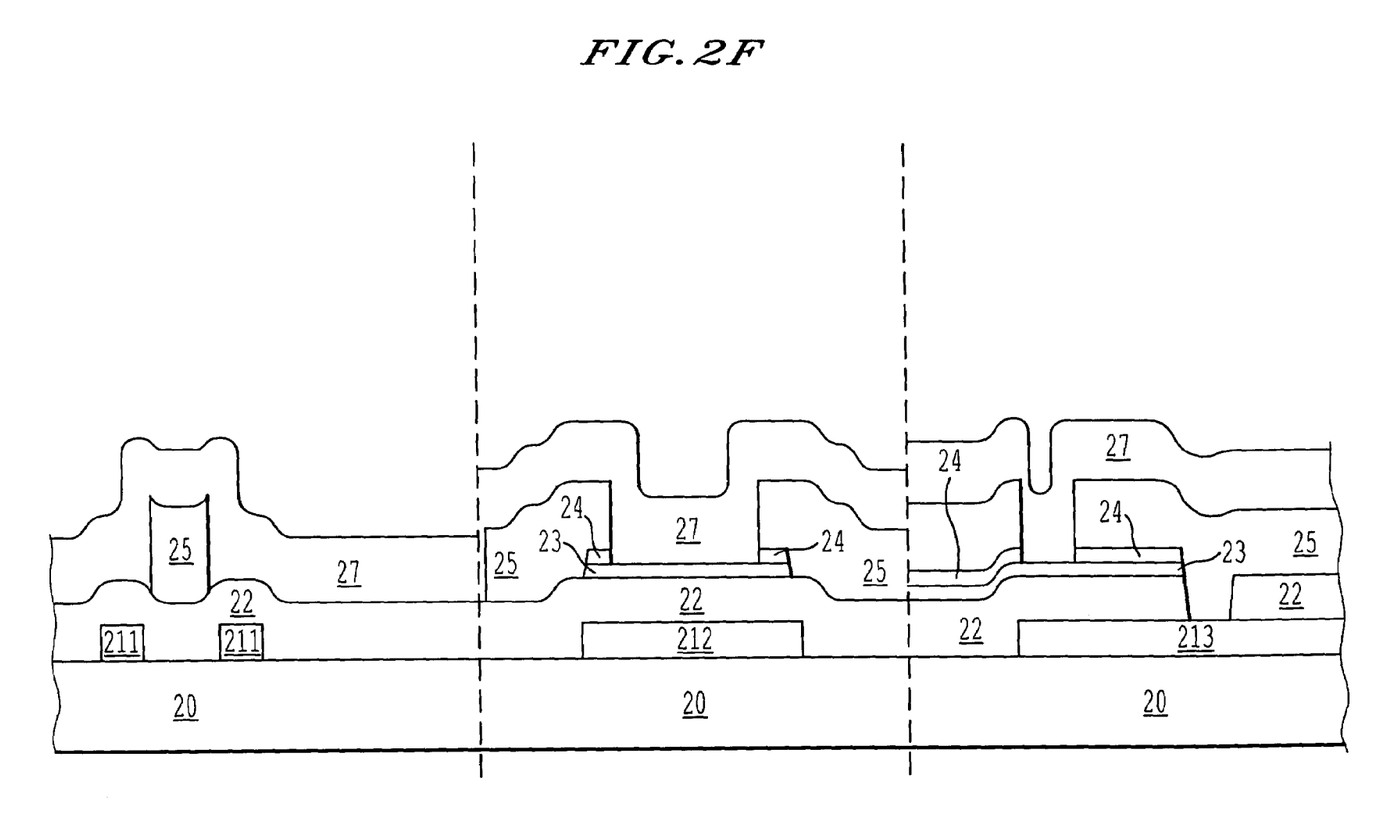

As shown in FIG. 2F, the passivation layer 27 is formed over the residual second metal layer 25, the exposed portion of the insulator layer 22 and the exposed portion of the silicon based layer 23. A further step is to form some OLB (outer lead bonding) pads over substrate 20 using a fourth mask.

Notice this example only limits the distribution and the shape of the photoresist layer 263, but does not limit how to form the photoresist layer 263. The mask shown in FIG. 2B is only an example and other ways are available to form the photoresist layer 263. However, to further explain the invention, this example presents a way to form the photoresist layer 263 using a phase shift mask.

As shown in FIG. 2B, the phase shift mask is made of the transparent substrate 260, the low transmittance pattern 261 and the high transmittance pattern 262. The low transmittance pattern 261 is located on the transparent substrate 260 and corresponding to the thicker portion of the photoresist layer 263, and the high transmittance pattern 262 is located on the transparent substrate 260 and corresponding to the thinner portion of the photoresist layer 263. There is no pattern formed over the partial transparent substrate 260 corresponding to the first contact hole 251.

The phase shift mask can be divided into three areas: a high transmittance area, a low transmittance area, and a transparent area. Thus, the phase shift mask can be used to pattern the contact hole, the channel islands and the pixel electrodes in one photolithography process.

In general, the transmittance of the high transmittance pattern 262 is approximately 30% to 70% and the transmittance of the low transmittance pattern 261 is approximately less than 30%. However, the real transmittance of each pattern 261, 262 is adjustable.

In addition, the high transmittance pattern 262 is generally made of a silicide layer, such as a Mo-silicide layer, and the low transmittance pattern 261 is generally made of a combination of a silicide layer and a Cr layer, such as a low resistance Cr layer. However, any phase shift mask could be used to form the required phase shift mask of the invention.

The comparison of FIG. 1F with FIG. 2F shows that the final structure of Samsung (FIG. 1F) is different than the final structure this example (FIG. 2F). One difference is in the anti-ESD circuit area, related to the electric conduction for connecting the n+ silicon based layer 14 and the first metal line 11, and to the electric conduction for connecting the semiconductive layer 24 and the third metal line 213. In other words, one difference is in the electric conduction for connecting both the gate and source (drain) of the transistor for providing the anti-ESD function.

The present invention is also directed to an IPS-LCD panel. A top-view of the IPS-LCD is shown in FIG. 3A and the cross-sectional view of the anti-ESD circuit area is shown in FIG. 3B.

Figure 3A:
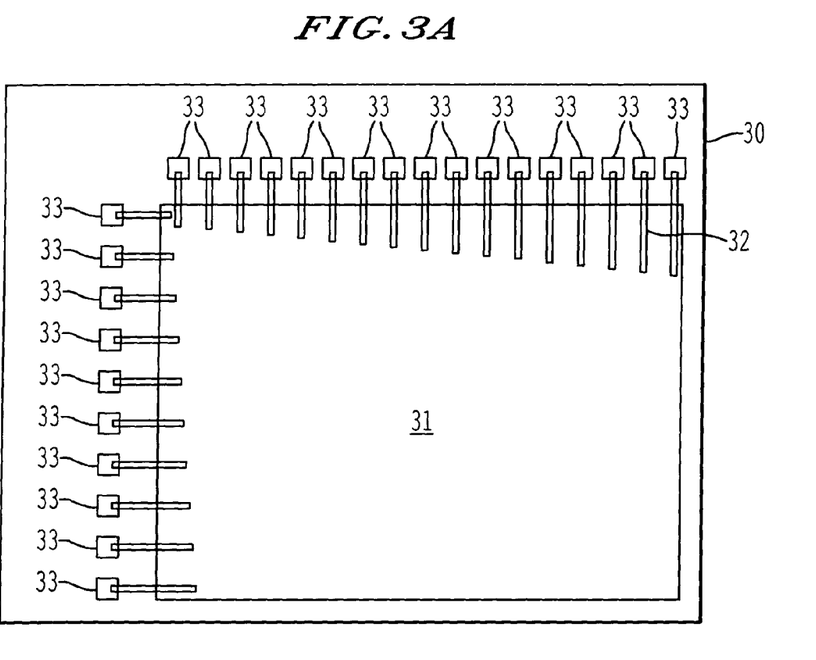
FIG. 3A is a top view illustrating an IPS-LCD according to a second example of the present invention.

As shown in FIG. 3A, this example has at least the following elements: a substrate 30 (which is generally a transparent substrate), an active area 31, a plurality of conductive lines 32, and a plurality of anti-ESD circuits 33. The active area 31 and the conductive lines 32 are located on the substrate 30. Further, each conductive line 32 is electrically connected with the active area 31 and has a terminal extending outside the active area 31. The anti-ESD circuits 33 are also located on the substrate 30, and each anti-ESD circuit 33 is electrically connected with one conductive line 32.

Figure 3B:
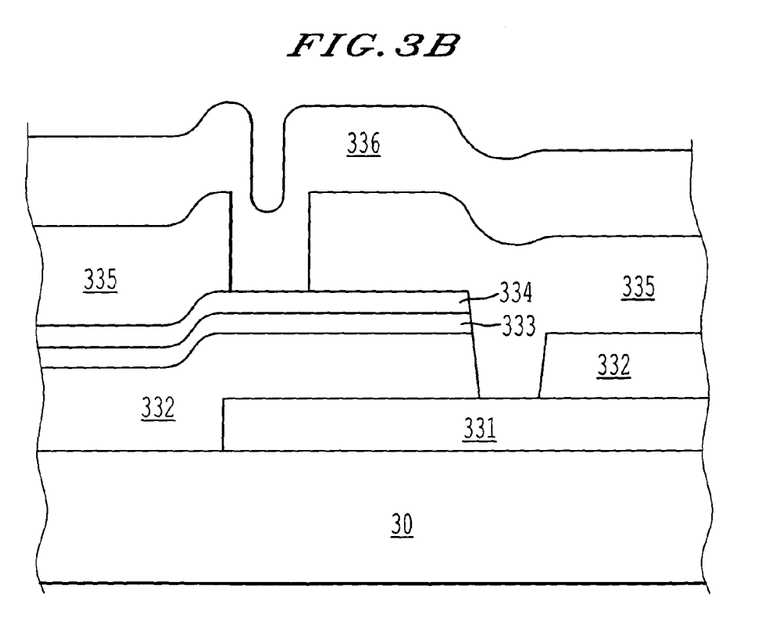
FIG. 3B is a cross-sectional view showing the method of manufacturing the IPS-LCD according to the second example of the present invention.

As shown in FIG. 3B, the anti-ESD circuit 33 includes a gate 331, an insulator layer 332, a silicon based layer 333, a semiconductive layer 334, a conductive layer 335, and a passivation layer 336.

Comparing FIG. 3B with FIG. 1F and FIG. 2F illustrates that the conductive layer 335 (the electric connection) of this example is entirely located under the passivation layer 336, but the ITO layer 18 of Samsung, shown in FIG. 1F, crosses the passivation layer 17.

Moreover, the conductive layer 335 of this example directly contacts the surface of the semiconductive layer 334. Thus, it is not necessary to form a dielectric layer on the semiconductive layer 334 before forming the conductive layer 335. Further, it is possible that the top surface of the semiconductive layer 334 is not directly connected with a dielectric layer, especially the passivation layer 336.

In addition, it is not necessary to form a contact hole in the passivation layer 336 to pass through the conductive layer 335. Thus, there is no conductive material on the passivation layer 336. Because the conductive layer 335 entirely located under the passivation layer 336 and is formed on most of the insulator layer 332, the location of the conductive layer 335 is similar to the location of the second metal layer of the conventional IPS-LCD. Thus, while the IPS-LCD is formed by using a 4mask process, the conductive layer can be the second metal layer.

Therefore, the conductive layer 335 can be further used to form the conductive lines 32 inside the active area 31. Similarly, the conductive layer 335 also can be used to form many pixel electrodes over the substrate 30.

Finally, the following features further distinguish the present invention from the method of Samsung:

(a) The contact holes are patterned with the channel islands during the same photolithography process.

(b) A phase shift mask is used to pattern the contact holes and the channel islands. Further, a transparent pattern is located over the contact holes, a low transmittance pattern is located over the channel islands and a high transmittance is located over other portions of the substrate.

(c) The contact hole is patterned before the formation of the second metal layer. Hence, the contact hole is filled by the second metal layer (not by the conventional ITO layer), and the manufacturing cost of the ITO layer is eliminated.

(d) No additional metal process is required to form the electric conduction of the anti-ESD circuit after the formation of the passivation layer.

(f) The electric connection is entirely located under the passivation layer.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing IPS-LCD by using 4-mask process, comprising:

providing a substrate having a first area, a second area and a third area;

forming a first metal layer on said substrate;

patterning said first metal layer using a first mask to form a plurality of first metal lines, a plurality of second metal lines and a plurality of third metal lines, said first, second, and third metal lines being formed on a corresponding said first, second, and third area of said substrate;

forming an insulator layer, a silicon based layer and a semiconductive layer sequentially on said substrate and said plurality of first, second and third metal lines;

forming a photoresist layer on said semiconductive layer using a second mask, said photoresist layer having a plurality of openings over segments of said third metal lines, said photoresist layer having a thicker portion on said second metal lines, the proximate areas of said second metal lines, the segments of said third metal lines and a partial area of said semiconductive layer on said third area, and said photoresist layer having a thinner portion on other portions of said semiconductive layer;

partially removing said semiconductor layer, said silicon based layer and said insulator layer using said photoresist layer as a mask, said third metal lines under said openings being partially exposed by a plurality of first contact holes inside said semiconductive layer, said silicon based layer and said insulator layer;

ashing said photoresist layer, wherein said thinner portion of said photoresist layer is removed and the thickness of said thicker portion of said photoresist layer is reduced;

partially removing said semiconductive layer and said silicon based layer using the remaining said photoresist layer as a mask, wherein a portion of said insulation layer is exposed;

removing the remaining photoresist layer;

forming a second metal layer on an exposed portion of said insulator layer and the remaining semiconductive layer, wherein said first contact holes are filled by said second metal layer;

patterning said second metal layer using a third mask, a plurality of second contact holes being formed in said second metal layer and on each of said second and third metal lines, said first and second contact holes not overlapping;

removing partial of said semiconductive layer that is exposed from said second contact holes; and forming a passivation layer on the remaining second metal layer, the exposed portion of said insulator layer and the exposed portion of said silicon based layer, wherein the thickness of the thinner portion of said photoresist layer is about thirty percent of the thickness of the thicker portion of said photoresist layer.

2. The method of claim 1, wherein said first area is a common/pixel area, said second area is a transistor area, and said third area is an anti-ESD Electro Static Discharge circuit area.

3. The method of claim 1, further comprising forming a plurality of outer lead bonding pads over said substrate by using a fourth mask.

4. The method of claim 1, wherein said second mask is a phase shift mask.

5. The method of claim 4, wherein said phase shift mask comprises a transparent substrate, a high transmittance pattern and a low transmittance pattern, wherein said high transmittance pattern is located on said transparent substrate and over the thinner portion of said photoresist layer, and wherein said low transmittance pattern is located on said transparent substrate and over the thicker portion of said photoresist layer.

6. The method of claim 5, wherein the transmittance of said high transmittance pattern is approximately thirty to seventy percent.

7. The method of claim 5, wherein the transmittance of said low transmittance pattern is approximately less than thirty percent.

8. The method of claim 5, wherein said high transmittance pattern includes a silicide layer.

9. The method of claim 8, wherein said silicide layer is comprises a Mo-silicide layer.

10. The method of claim 5, wherein said low transmittance pattern includes a combination of a silicide layer and a Cr layer.

11. The method of clam 10, wherein said Cr layer comprises a low resistance Cr layer.

12. A method of manufacturing IPS-LCD by using 4-mask process, comprising:

providing a substrate having a first area, a second area and a third area;

forming a first metal layer on said substrate;

patterning said first metal layer using a first mask to form a plurality of first metal lines, a plurality of second metal lines and a plurality of third metal lines, said first, second, and third metal lines being formed on a corresponding said first, second, and third area of said substrate;

forming an insulator layer, a silicon based layer and a semiconductive layer sequentially on said substrate and said plurality of first, second and third metal lines;

forming a photoresist layer on said semiconductive layer using a second mask, said photoresist layer having a plurality of openings over segments of said third metal lines, said photoresist layer having a thicker portion on said second metal lines, the proximate areas of said second metal lines, the segments of said third metal lines and a partial area of said semiconductive layer on said third area, and said photoresist layer having a thinner portion on other portions of said semiconductive layer;

partially removing said semiconductor layer, said silicon based layer and said insulator layer using said photoresist layer as a mask, said third metal lines under said openings being partially exposed by a plurality of first contact holes inside said semiconductive layer, said silicon based layer and said insulator layer;

ashing said photoresist layer, wherein said thinner portion of said photoresist layer is removed and the thickness of said thicker portion of said photoresist layer is reduced;

partially removing said semiconductive layer and said silicon based layer using the remaining said photoresist layer as a mask, wherein a portion of said insulation layer is exposed;

removing the remaining photoresist layer;

forming a second metal layer on an exposed portion of said insulator layer and the remaining semiconductive layer, wherein said first contact holes are filled by said second metal layer;

patterning said second metal layer using a third mask, a plurality of second contact holes being formed in said second metal layer and on each of said second and third metal lines, said first and second contact holes not overlapping;

removing partial of said semiconductive layer that is exposed from said second contact holes; and forming a passivation layer on the remaining second metal layer, the exposed portion of said insulator layer and the exposed portion of said silicon based layer, wherein said first area is a common/pixel area, said second area is a transistor area, and said third area is an anti-ESD circuit area.

13. A method of manufacturing IPS-LCD by using 4-mask process, comprising:

providing a substrate having a first area, a second area and a third area;

forming a first metal layer on said substrate;

patterning said first metal layer using a first mask to form a plurality of first metal lines, a plurality of second metal lines and a plurality of third metal lines, said first, second, and third metal lines being formed on a corresponding said first, second, and third area of said substrate;

forming an insulator layer, a silicon based layer and a semiconductive layer sequentially on said substrate and said plurality of first, second and third metal lines;

forming a photoresist layer on said semiconductive layer using a second mask, said photoresist layer having a plurality of openings over segments of said third metal lines, said photoresist layer having a thicker portion on said second metal lines, the proximate areas of said second metal lines, the segments of said third metal lines and a partial area of said semiconductive layer on said third area, and said photoresist layer having a thinner portion on other portions of said semiconductive layer;

partially removing said semiconductor layer, said silicon based layer and said insulator layer using said photoresist layer as a mask, said third metal lines under said openings being partially exposed by a plurality of first contact holes inside said semiconductive layer, said silicon based layer and said insulator layer;

ashing said photoresist layer, wherein said thinner portion of said photoresist layer is removed and the thickness of said thicker portion of said photoresist layer is reduced;

partially removing said semiconductive layer and said silicon based layer using the remaining said photoresist layer as a mask, wherein a portion of said insulation layer is exposed;

removing the remaining photoresist layer;

forming a second metal layer on an exposed portion of said insulator layer and the remaining semiconductive layer, wherein said first contact holes are filled by said second metal layer;

patterning said second metal layer using a third mask, a plurality of second contact holes being formed in said second metal layer and on each of said second and third metal lines, said first and second contact holes not overlapping;

removing partial of said semiconductive layer that is exposed from said second contact holes; and forming a passivation layer on the remaining second metal layer, the exposed portion of said insulator layer and the exposed portion of said silicon based layer, said forming a photoresist layer on said semiconductive layer utilizing a three-level transmittance mask.

14. The method of claim 13, further comprising forming a plurality of outer lead bonding pads over said substrate by using a fourth mask.

15. The method of claim 13, wherein said second mask comprises a phase shift mask including a transparent substrate, a high transmittance pattern and a low transmittance pattern, wherein said high transmittance pattern is located on said transparent substrate and over the thinner portion of said photoresist layer, and wherein said low transmittance pattern is located on said transparent substrate and over the thicker portion of said photoresist layer.

16. The method of claim 15, wherein the transmittance of said high transmittance pattern is approximately thirty to seventy percent.

17. The method of claim 15, wherein the transmittance of said low transmittance pattern is approximately less than thirty percent.

18. The method of claim 15, wherein said high transmittance pattern includes a silicide layer.

19. The method of claim 18, wherein said silicide layer comprises a Mo-silicide layer.

20. The method of claim 15, wherein said low transmittance pattern includes a combination of a silicide layer and a Cr layer.

21. The method of clam 20, wherein said Cr layer comprises a low resistance Cr layer.

* * * * *

UNITED STATES PATENT AND TRADEMARK OFFICE
CERTIFICATE OF CORRECTION

PATENT NO. : 6,972,819 B2
DATED : December 6, 2005
INVENTOR(S) : Lee et al.

It is certified that error appears in the above-identified patent and that said Letters Patent is hereby corrected as shown below:

<u>Title page,</u>
Item [75], Inventors, should read:
-- Deuk-Su Lee, Taoyuan Hsien (TW);
   Sakae Tanaka, Taoyuan Hsien (TW) --.

Signed and Sealed this

Fourteenth Day of February, 2006

JON W. DUDAS
*Director of the United States Patent and Trademark Office*